United States Patent [19]
Sato et al.

[11] Patent Number: 5,523,984
[45] Date of Patent: Jun. 4, 1996

[54] CLOCK DISTRIBUTING METHOD AND APPARATUS

[75] Inventors: Hiroyuki Sato; Jinichi Yoshizawa; Hiroomi Tateishi; Haruo Yamashita; Junichi Tamura, all of Kawasaki, Japan

[73] Assignee: Fujitsu Limited, Kanagawa, Japan

[21] Appl. No.: 189,164

[22] Filed: Jan. 28, 1994

[30] Foreign Application Priority Data

Sep. 20, 1993 [JP] Japan .................................... 5-257588

[51] Int. Cl.$^6$ ............................ G04C 11/00; H03K 1/16; A03K 5/15
[52] U.S. Cl. ........................ 368/46; 327/152; 327/237; 327/258; 327/295
[58] Field of Search ................... 368/10, 46, 52, 368/59, 113–120; 327/152, 158, 144, 145, 237, 258, 291, 292, 295; 328/62, 63, 55, 105, 155; 375/87, 110, 120

[56] References Cited

U.S. PATENT DOCUMENTS

| | | | |
|---|---|---|---|
| 3,688,200 | 8/1972 | Niki et al. | 328/62 |
| 3,921,079 | 11/1975 | Heffner et al. | 328/62 |
| 4,063,308 | 12/1977 | Collins et al. | 364/200 |
| 5,007,829 | 2/1992 | Ishibashi et al. | 307/269 |
| 5,278,457 | 1/1994 | Fujita et al. | 307/209 |

FOREIGN PATENT DOCUMENTS

| | | |
|---|---|---|
| 1531894 | 11/1978 | United Kingdom . |
| 2049334 | 12/1980 | United Kingdom . |
| 2127594 | 4/1984 | United Kingdom . |

*Primary Examiner*—Vit W. Miska

[57] ABSTRACT

Disclosed is a clock distributing apparatus for distributing clock signals with a desired phase to each of devices provided between a clock generating section (10) for generating clock signals and a plurality of devices (30) for receiving the clock signals. A delay generating section (21) generates a plurality of delay clock signals by imparting a plurality of delay quantities to the clock signals from the clock generating section. A clock distributing section (22) has a plurality of input terminals corresponding to the plurality of delay clock signals and a plurality of output terminals corresponding to the respective devices. The clock distributing section (22) distributes desired delay clock signals to one or more output terminals by selecting the input terminals corresponding to the desired delay clock signals.

12 Claims, 14 Drawing Sheets

CLOCK DISTRIBUTING METHOD AND APPARATUS

BACKGROUND OF THE INVENTION

The present invention relates to a method and an apparatus for distributing clock signals to each of a plurality of devices incorporated into an electronic computer.

The electronic computer is provided with a plurality of devices. Each device executes processes while being synchronized by use of the clock signals. Employed in this case is a clock distributing apparatus for distributing the clock signals to the respective devices. Phases of the clock signals distributed to the devices shift due to a difference in length between connection lines connected to the clock distributing apparatus. Under such circumstances, a delay element incorporated into the clock distributing apparatus supplies each device with in-phase clock signals.

A known clock distributing apparatus is disclosed in, e.g., Japanese Patent Laid-Open Publication No. 55-960. This clock distributing apparatus includes the delay element corresponding to each of a plurality of packages defined as the plurality of devices. Each delay element distributes the clock signals generated by a clock generating section to the respective packages with a predetermined quantity of delay.

At this time, a phase measuring section compares a phase difference between the clock signal generated by the clock generating section and the clock signal distributed to each package. The in-phase clock signal is supplied to each package. For this purpose, each delay element gives a delay quantity corresponding to the phase difference therebetween. That is, this clock distributing apparatus distributes the equiphase clock signals to the respective packages by automatically adjusting the delay quantities of the respective delay elements.

Further, another known clock distributing apparatus is disclosed in, e.g., Japanese Patent Laid-Open Publication No. 63-87015. This clock distributing apparatus includes a program delay element per package. Each program delay element selects a desired delay quantity from a plurality of delay quantities. Namely, the program delay element automatically adjusts the delay quantity of the clock signal, thereby reducing the number of adjusting steps for an optimum phase of the clock signal.

In the known clock distributing apparatuses, however, because of the delay element being provided per package, the number of delay elements increase with an increment in the number of packages. For this reason, the clock distributing apparatuses become intricate in terms of their configurations.

Moreover, when actually adjusting the phase of the clock signal, the phase measuring section measures the phase of the clock signal delayed by the delay element having a certain delay quantity. Based on this measured phase quantity, the delay element having a certain delay quantity is exchanged to the delay element adjusted to the optimum delay quantity. This therefore conduces to a problem of requiring a large number of adjusting steps.

Further, the another known clock distributing apparatuses includes the plurality of delay elements and a selecting circuit for selecting the plurality of delay quantities for every program delay element. For this reason, the configuration of the clock distributing apparatus becomes complicated.

SUMMARY OF THE INVENTION

It is a primary object of the present invention to provide a clock distributing apparatus and a clock distributing method which are capable of being simply constructed and reducing the number of adjusting steps for an optimum phase of a clock signal.

A clock distributing apparatus according to the present invention is provided between a clock generating section for generating clock signals and a plurality of devices for receiving the clock signals. The clock distributing apparatus comprises a phase adjusting section for adjusting a phase of the clock signal to distribute the clock signals from the clock generating section to each of the plurality of devices.

The phase adjusting section includes a delay generating section and a clock distributing section. The delay generating section generates a plurality of clock signals by imparting plural kinds of delay quantities to the clock signals from the clock generating section.

The clock distributing section has input terminals corresponding to the respective delay clock signals and output terminals corresponding to the respective devices. The clock distributing section distributes desired delay clock signals among the plurality of delay clock signals to one or more output terminals via the input terminals corresponding to the desired delay clock signals.

The phase adjusting section includes a delay width setting section. The delay width setting section sets a delay width defined as a basis of each delay quantity to stepwise change each of the plurality of delay quantities.

The delay width setting section changes the delay width to a different delay width to obtain a desired delay clock signal if no desired delay clock signal exists in the delay clock signals generated based on the stepwise delay quantities.

The clock distributing section is comprised of a space switch for mutually connecting the input terminals to the output terminals.

The phase adjusting section includes a distribution control section for performing the control to mutually connect the input terminals to the output terminals of the clock distributing section.

The distribution control section controls the connections between the input terminals and the output terminals of the clock distributing section so that all of the delay clock signals distributed to the devices to take synchronism with each other among the plurality of devices receiving the delay clock signals assume an equiphase.

The clock distributing apparatus further comprises a phase measuring section for measuring phases of all of the delay clock signals distributed to the devices to take synchronism with each other. The distribution control section selects the input terminals of the clock distributing means per device to take synchronism so that all of the phases measured by the phase measuring section become equiphases.

The clock generating section includes a first clock generating section and a second clock generating section. The first clock generating section generates a first clock signal. The second clock generating section generates a second clock signal assuming a phase different from that of the first clock signal.

The phase adjusting section includes a first phase adjusting section for inputting the first clock signal from the first clock generating section and a second phase adjusting section for inputting the second clock signal from the second clock generating section.

Each of the devices includes a selecting section for selecting any one of the first and second phase adjusting sections.

The first and second phase adjusting sections include a delay generating section, a clock distributing section and a distribution control section. The delay generating section generates a plurality of delay clock signals by giving plural kinds of delay quantities to the clock signals inputted.

The clock distributing section has input terminals corresponding to the delay clock signals and output terminals corresponding to the respective devices. The clock distributing section distributes a desired clock signal among the plurality of delay clock signals to one or more output terminals via the input terminal corresponding to the desired delay clock signal.

The distribution control section controls the input terminals of the clock distributing section so that a phase of the delay clock signal from one clock distributing section and a phase of the delay clock signal from the other clock distributing section become equiphases at the input of the selecting section.

The clock distributing apparatus further comprises a phase measuring section. The phase measuring section measures a phase of the delay clock signal from one clock distributing section and a phase of the delay clock signal from the other clock distributing section at the input of the selecting section. The distribution control section selects the input terminal of the clock distributing section so that two phases measured by the phase measuring section become equiphases.

The first and second phase adjusting sections include a delay width setting section for setting a delay width defined as a basis of each delay quantity to stepwise change each of the plurality of delay quantities.

The delay width setting section provided in the first and second phase adjusting sections changes the delay width to a different delay width to obtain a desired delay clock signal if no desired delay clock signal exists in the delay clock signals generated based on the stepwise delay quantities.

The selecting section switches over, if a trouble happens in one of the first and second phase adjusting sections, one phase adjusting section to the other phase adjusting section.

Each of the devices includes a plurality of circuits, a delay generating section and a clock distributing section. Each circuit executes processes. The delay generating section generates the plurality of delay clock signals by imparting plural kinds of delay quantities to the clock signals from the selecting section.

The clock distributing section has input terminals corresponding to the respective delay clock signals and output terminals corresponding to the respective circuits. The clock distributing section distributes desired delay clock signals among the plurality of delay clock signals to one or more output terminals via the input terminals corresponding to the desired delay clock signals.

Further, according to a clock distributing method, clock signals obtained by a clock generating step of generating the clock signals are distributed to each of a plurality of devices. The clock distributing method comprises a phase adjusting step. In the phase adjusting step, a phase of the clock signal is adjusted to distribute the clock signals obtained in the clock generating step to each of the plurality of devices.

The phase adjusting step includes a delay generating step and a clock distributing step. The delay generating step is to generate a plurality of clock signals by imparting plural kinds of delay quantities to the clock signals obtained in the clock generating step.

The clock distributing step is to distribute desired delay clock signals among the plurality of delay clock signals to one or more output terminals via the input terminals corresponding to the desired delay clock signals by use of input terminals corresponding to the respective delay clock signals and output terminals corresponding to the respective devices.

The clock generating step includes a first clock generating step and a second clock generating step. The first clock generating step is to generate a first clock signal. The second clock generating step is to generate a second clock signal assuming a phase different from that of the first clock signal.

The phase adjusting step includes a first phase adjusting step and a second phase adjusting step. The first phase adjusting step is to input the first clock signal obtained by the first clock generating step. The second phase adjusting step is to input the second clock signal obtained by the second clock generating step.

A selecting step is to select any one of the first and second phase adjusting steps.

The first and second phase adjusting steps include a delay generating step, a clock distributing step and a distribution control step. The delay generating step is to generate a plurality of delay clock signals by giving plural kinds of delay quantities to the clock signals inputted.

The clock distributing step is to distribute a desired clock signal among the plurality of delay clock signals to one or more output terminals via the input terminal corresponding to the desired delay clock signal by use of an input terminal corresponding to the delay clock signal and an output terminal corresponding to each device.

The distribution control step is to control the input terminal employed in the clock distributing step so that a phase of the delay clock signal obtained by one clock distributing step and a phase of the delay clock signal obtained by the other clock distributing step become equiphases at the input in the selecting step.

According to the thus constructed clock distributing apparatus of this invention, the delay generating section imparts the plural kinds of delay quantities to the clock signals coming from the clock generating section, thereby generating the plurality of delay clock signals.

Then, the clock distributing section distributes the desired delay clock signal among the plurality of delay clock signals to one or more output terminals via the input terminal corresponding to the desired delay clock signal.

Thus, the clock distributing apparatus comprises only the single delay generating section and the single clock distributing section. The construction of the clock distributing apparatus can be therefore simplified. Further, the delay clock signals are distributed with a desired phase to one or more devices.

Moreover, the delay width setting section stepwise sets the plurality of delay quantities by use of the delay width. The desired delay clock signal is selected from the plurality of delay clock signals generated based on the plurality of stepwise delay quantities. The phase is adjusted by this desired delay clock signal, thereby decreasing the number of adjusting steps.

Besides, the phase measuring section measures the phases of all of the delay clock signals distributed to the devices to take synchronism with each other. The distribution control section selects the input terminal of the clock distributing section for every device to take synchronism so that all of the phases measured by the phase measuring section become equiphases.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Concrete embodiments of a clock distributing apparatus of this invention will hereinafter be described.

<Embodiment 1>

Figure 1:
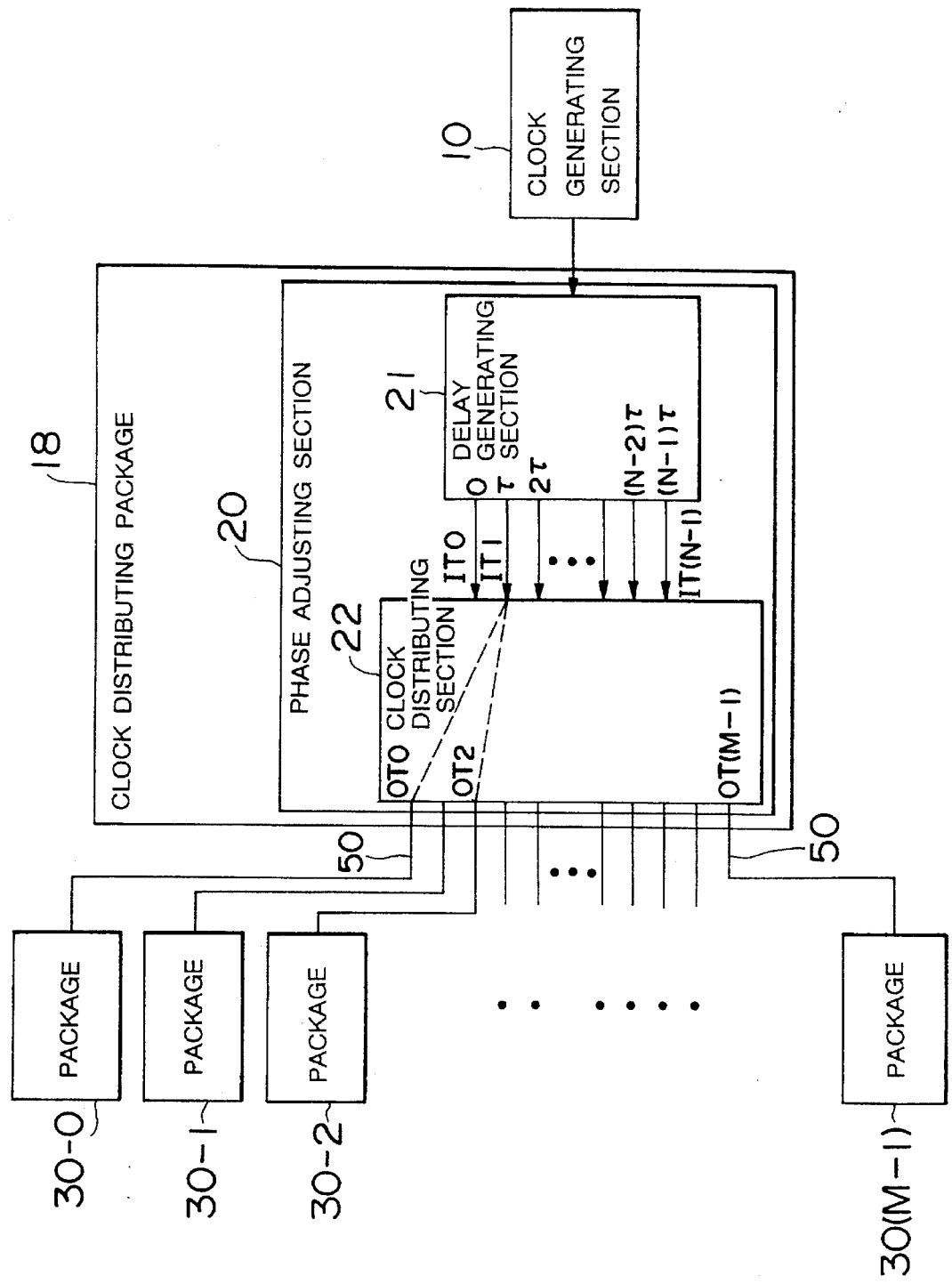
FIG. 1 is a block diagram illustrating a configuration of a clock distributing apparatus in accordance with an embodiment 1 of this invention.

FIG. 1 is a block diagram illustrating a configuration of the clock distributing apparatus in accordance with an embodiment 1 of the present invention.

The clock distributing apparatus is, for instance, a clock distributing package. The clock distributing package is constructed of one printed circuit board. Connected to a clock distributing package 18 is a clock generating section 10 for generating clock signals. A plurality of packages 30 provided in an unillustrated electronic computer are connected to the clock distributing package 18. Each package is comprised of one printed circuit board.

The clock distributing package 18 includes a phase adjusting section 20. The phase adjusting section 20 adjusts phases of the clock signals to distribute the clock signals from the clock generating section 10 via connection lines 50 to each of the plurality of packages 30.

The phase adjusting section 20 includes a delay generating section 21 and a clock distributing section 22. The delay generating section 21 generates a plurality of delay clock signals by giving plural kinds of delay quantities to the clock signals from the clock generating section 10. The delay generating section 21 is comprised of, e.g., delay lines or a plurality of buffer memories.

Each of the plurality of delay quantities is set with an integral multiple on the basis of a delay width $\tau$. The delay quantities are outputted to a plurality of output terminals corresponding to the plurality of delay quantities. The delay lines receive the respective delay quantities from tap outputs provided at fixed intervals. The plurality of buffers are each serially connected. The respective delay quantities are obtained from outputs of the buffers.

The clock distributing section 22 is connected to this delay generating section 21. The clock distributing section 22 is defined as a space switch. This space switch has input terminals IT0~IT(N−1) corresponding to the delay clock signals. The space switch also has output terminals OT0~TO(M−1) corresponding to the packages 30-0~30-(M−1). This space switch is an N×M switch provided with an N-number of input terminals and an M-number, larger than N, of output terminals. The input terminals IT0~IT(N−1) are mutually connected to the output terminals OT0~OT(M−1).

The output terminals OT0~TO(M−1) are connected via the connection lines 50 to the corresponding packages. The clock distributing section 22 distributes desired delay clock signals among the plurality of delay clock signals to one or more output terminals via the input terminals corresponding to the desired delay clock signals.

<Operations of Embodiment 1>

Figure 2:
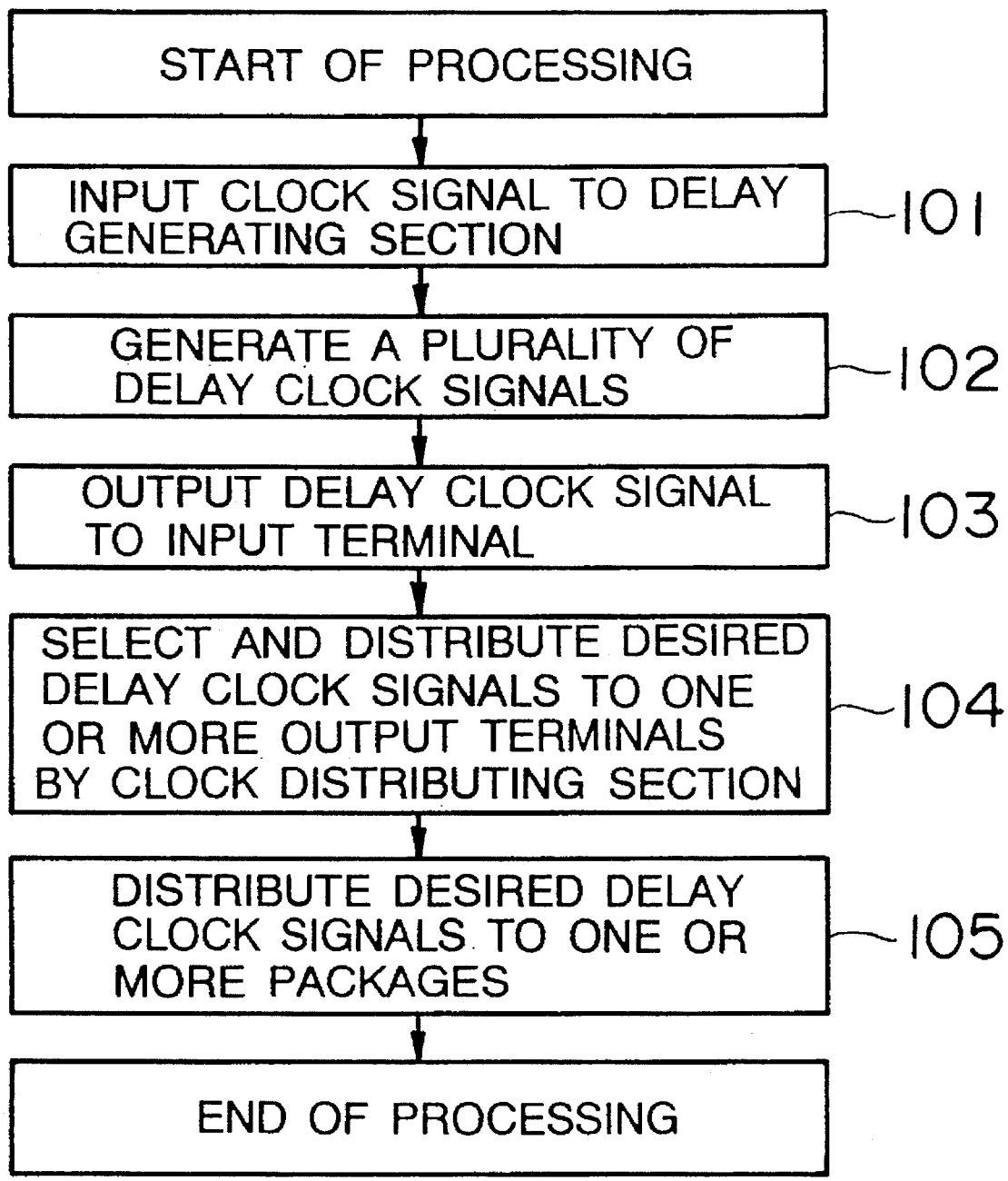
FIG. 2 is a flowchart showing a clock distributing method in accordance with the embodiment 1 of this invention.

FIG. 2 is a flowchart showing a clock distributing method in accordance with the embodiment 1 of this invention. To start with, the clock signals generated by the clock generating section 10 are inputted to the delay generating section 21 (step 101). Next, the delay generating section 21 generates the plurality of delay clock signals by imparting the plurality of delay quantities (0, $\tau$, $2\tau$, $3\tau$, ... (N−1)$\tau$) set with the integral multiple of the delay width $\tau$ to the clock signals on the basis of the delay width $\tau$ (step 102).

Then, the delay generating section 21 outputs the delay clock signals generated based on the delay quantities to the corresponding input terminals IT0~IT(N−1) of the clock distributing section 22 (step 103).

The clock distributing section 22 selects the input terminals corresponding to the desired delay clock signals, thereby distributing the desired delay clock signals to one or more output terminals (step 104). For example, as illustrated in FIG. 1, the delay clock signals of the delay width $\tau$ which are inputted to the input terminal IT1 are outputted to the output terminals OT0, OT2.

Subsequently, the delay clock signals of the delay width $\tau$ are distributed to the packages 30-0, 30-2 (step 105).

Thus, the signal delay generating section 21 and the signal clock distributing section 22 are merely employed, and, therefore, a configuration of the clock distributing device 18 can be simplified. The desired delay clock signals can be distributed to one or more packages 30.

<Embodiment 2>

Figure 3:
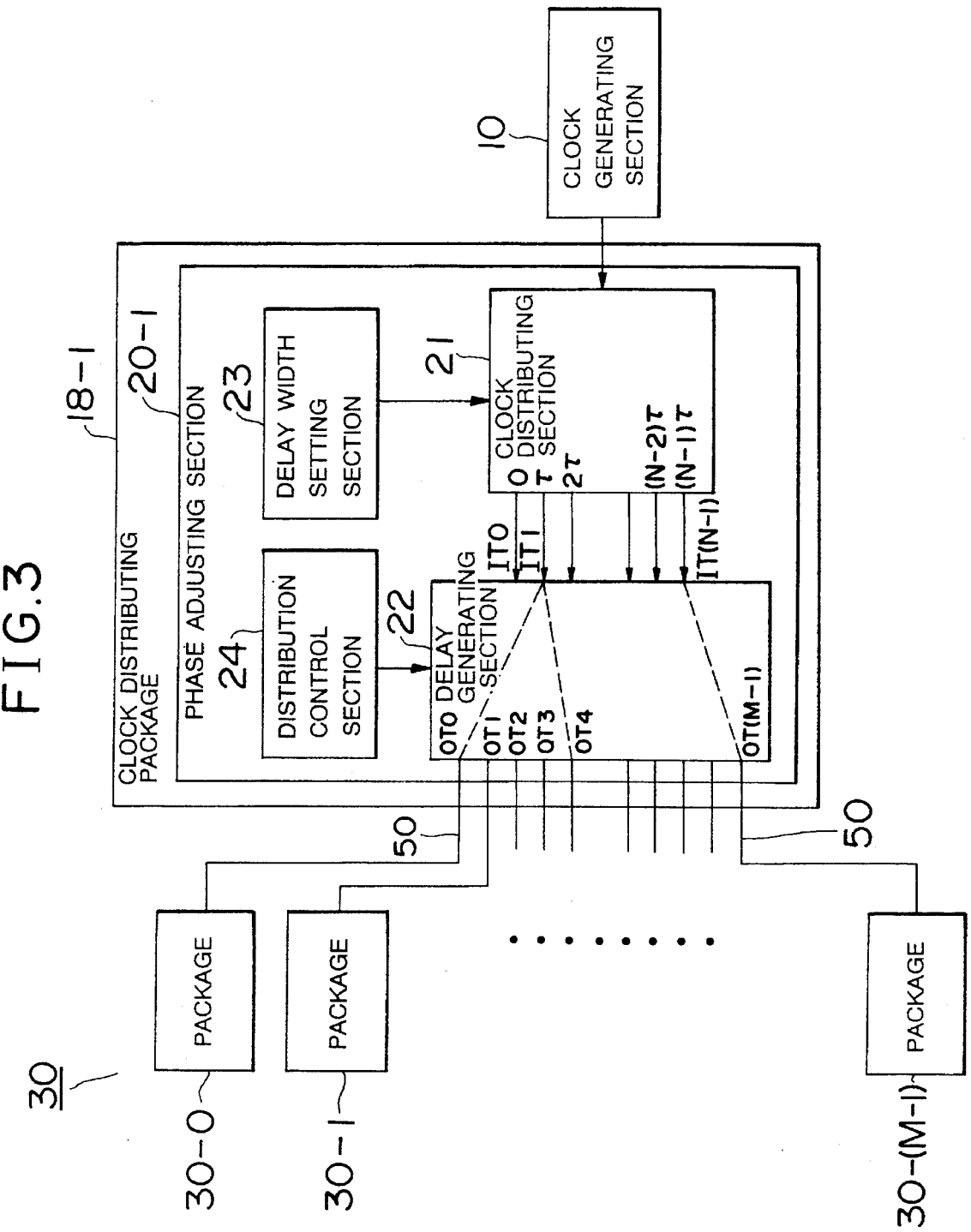
FIG. 3 is a block diagram showing a configuration of the clock distributing apparatus in accordance with an embodiment 2 of this invention.

FIG. 3 is a block diagram illustrating a configuration of the clock distributing apparatus in accordance with an embodiment 2 of the present invention. A clock distributing package 18-1 in the embodiment 2 includes a phase adjusting section 20-1. The phase adjusting section 20-1 comprises a delay generating section 21, a clock distributing section 22, a delay width setting section 23 and a distribution control section 24. The configurations of the delay generating section 21 and the distributing section 22 have been described in the embodiment 1, and hence explanations thereof are omitted.

The delay width setting section 23 and the clock distributing section 22 are connected to the delay generating section 21. The delay width setting section 23 sets the delay width τ serving as a basis of each delay quantity in order to stepwise change each of the plurality of delay quantities.

The delay width setting section 23, if no desired delay cock signal exists in the delay clock signals generated based on the stepwise delay quantities, change the above delay width to a different delay width to obtain a desired delay clock signal.

The distribution control section 24 is connected to the clock distributing section 22. The distribution control section 24 performs the control to mutually connect the output terminals and the input terminals of the clock distributing section 22.

<Operations of Embodiment 2>

Figure 4:
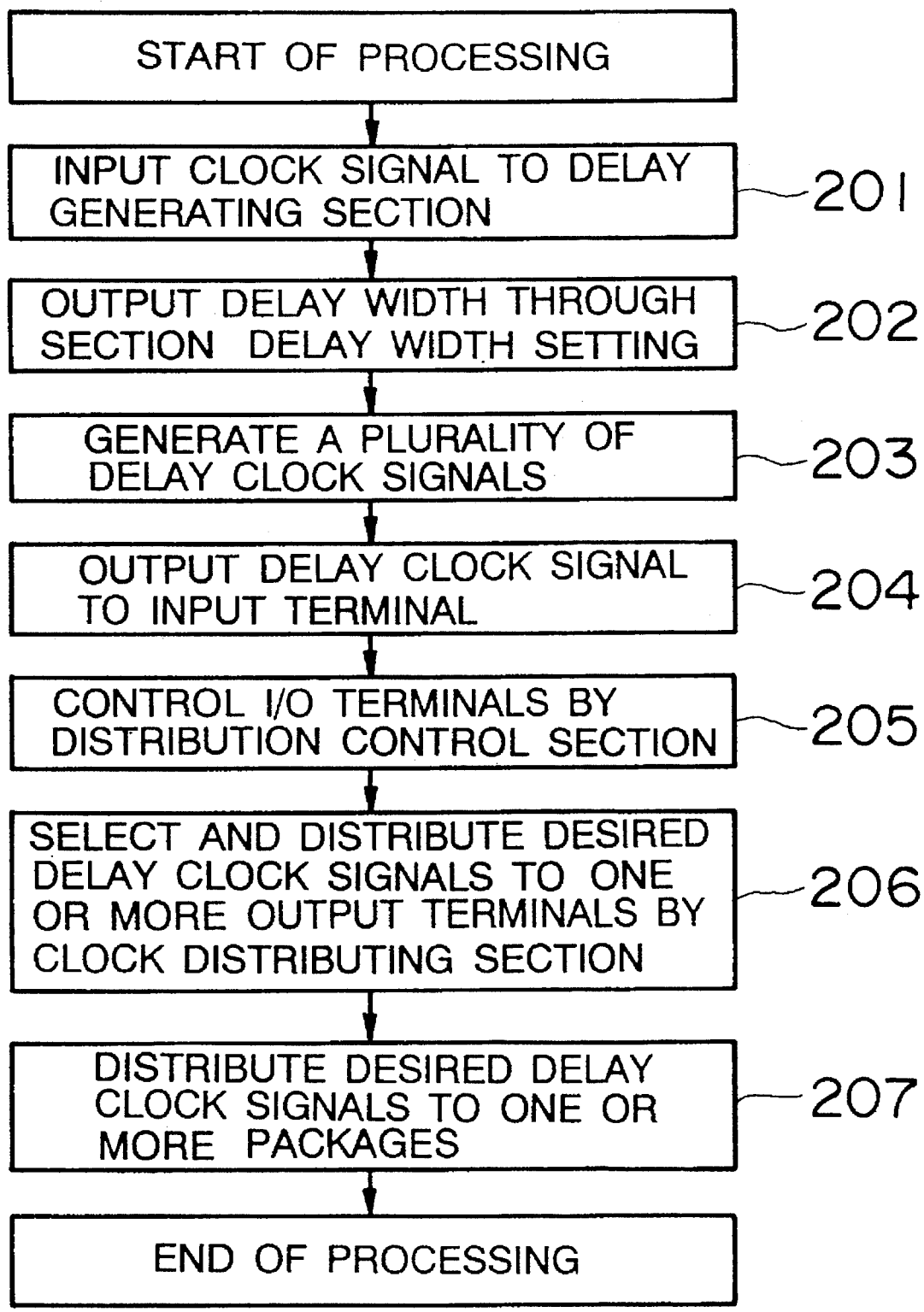
FIG. 4 is a flowchart illustrating the clock distributing method in accordance with the embodiment 2 of this invention.

Next, operations of the thus constructed embodiment 2 will be explained. FIG. 4 is a flowchart showing the clock distributing method in accordance with the embodiment 2 of this invention.

Firstly, the clock signals generated by the clock generating section 10 are inputted to the delay generating section 21 (step 201). Next, the delay width τ is given from the delay width setting section 23 to the delay generating section 21 (step 202). The delay generating section 21 generates the plurality of delay clock signals by imparting the plurality of delay quantities $(0, τ, 2τ, 3τ, \ldots (N-1)τ)$ set with the integral multiple of the delay width τ to the clock signals on the basis of the delay width τ (step 203). Then, the delay generating section 21 outputs the plurality of delay clock signals generated based on the plurality of delay quantities to the corresponding input terminals IT0~IT(N−1) of the clock distributing section 22 (step 204).

The distribution control section 24 effects the control to mutually connect the output terminals and the input terminals of the clock distributing section 22 (step 205).

The clock distributing section 22 selects the input terminals corresponding to the desired delay clock signals under control of the distribution control section 24, thereby distributing the desired delay clock signals to one or more output terminals (step 206). For example, as illustrated in FIG. 3, the delay clock signals of the delay width τ which are inputted to the input terminal IT1 are outputted to the output terminals OT0, OT4. Outputted to the output terminal OT(M−1) are the delay clock signals of a delay width (N−1)τ which are inputted to the input terminal IT(N−1).

Subsequently, the desired delay clock signals are distributed to one or more packages (step 207).

Thus, the single delay generating section 21 and the clock distributing section 22 are merely employed, and, therefore, a configuration of the clock distributing package 18-1 can be simplified. The desired delay clock signals can be distributed to one or more packages 30.

Further, the delay width setting section 23 stepwise sets the plurality of delay quantities by use of the delay width. Selected is a desired delay clock signal among the plurality of delay clock signals generated based on the plurality of stepwise delay quantities. The phase is adjusted by this desired delay clock signal, thereby decreasing the number of adjusting steps.

Note that no desired delay clock signal exists in the delay clock signals relative to the plurality of delay quantities in some cases. In this case, the delay width setting section 23 changes the delay width to a different delay width so as to obtain a desired delay clock signal. For instance, the delay width τ is set small for a high speed delay clock signal but large for a low-speed delay clock signal.

<Embodiment 3>

Figure 5:
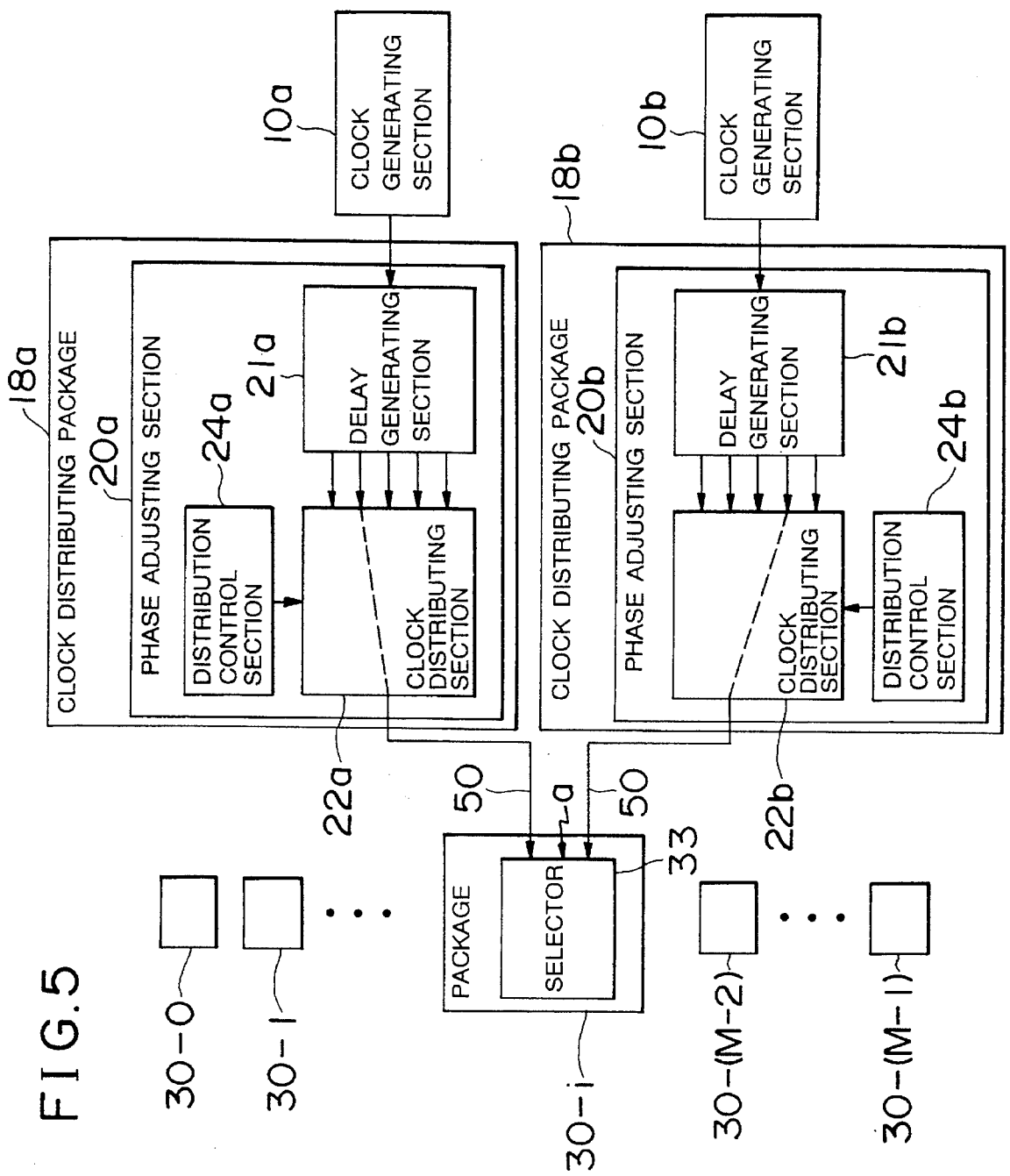
FIG. 5 is a block diagram illustrating a configuration of the clock distributing apparatus in accordance with an embodiment 3 of this invention.

FIG. 5 is a block diagram illustrating a configuration of the clock distributing apparatus in accordance with a third embodiment of this invention. A clock generating section 10a is connected to a clock distributing package 18a. The clock generating section 10a is also connected to a clock distributing package 18b. The clock generating section 10a generates a first clock signal. A clock generating section 10b generates a second clock signal exhibiting a phase different from that of the first clock signal. The above clock distributing package 18a includes a phase adjusting section 20a. The above clock distributing package 18b includes a phase adjusting section 20b.

The phase adjusting section 20a includes a delay generating section 21a, a clock distributing section 22a and a distribution control section 24a. The phase adjusting section 20b has a delay generating section 21b, a clock distributing section 22b and a distribution control section 24b.

The delay generating sections 21a, 21b generate a plurality of delay clock signals by imparting plural kinds of delay quantities to the clock signals inputted.

The clock distributing sections 22a, 22b have input terminals corresponding to the delay clock signals and output terminals corresponding to the packages 30-0~30-(M−1). The clock distributing sections 22a, 22b distribute desired delay clock signals among the plurality of delay clock signals to one or more output terminals via the input terminals corresponding to the desired delay clock signals.

The output terminals of the clock distributing sections 22a, 22b are connected via the connection lines 50 to the packages 30-0~30-(M−1).

Each of the packages 30-0~30-(M−1) has a selector 33 for selecting any one of the above phase adjusting sections 20a and 20b.

The distribution control sections 24a, 24b control the input terminals of the clock distributing sections 22a, 22b so that the delay clock signal from one clock distributing section assumes an equiphase with respect to the delay clock signal from the other clock distributing section.

<Operations of Embodiment 3>

Figure 6:
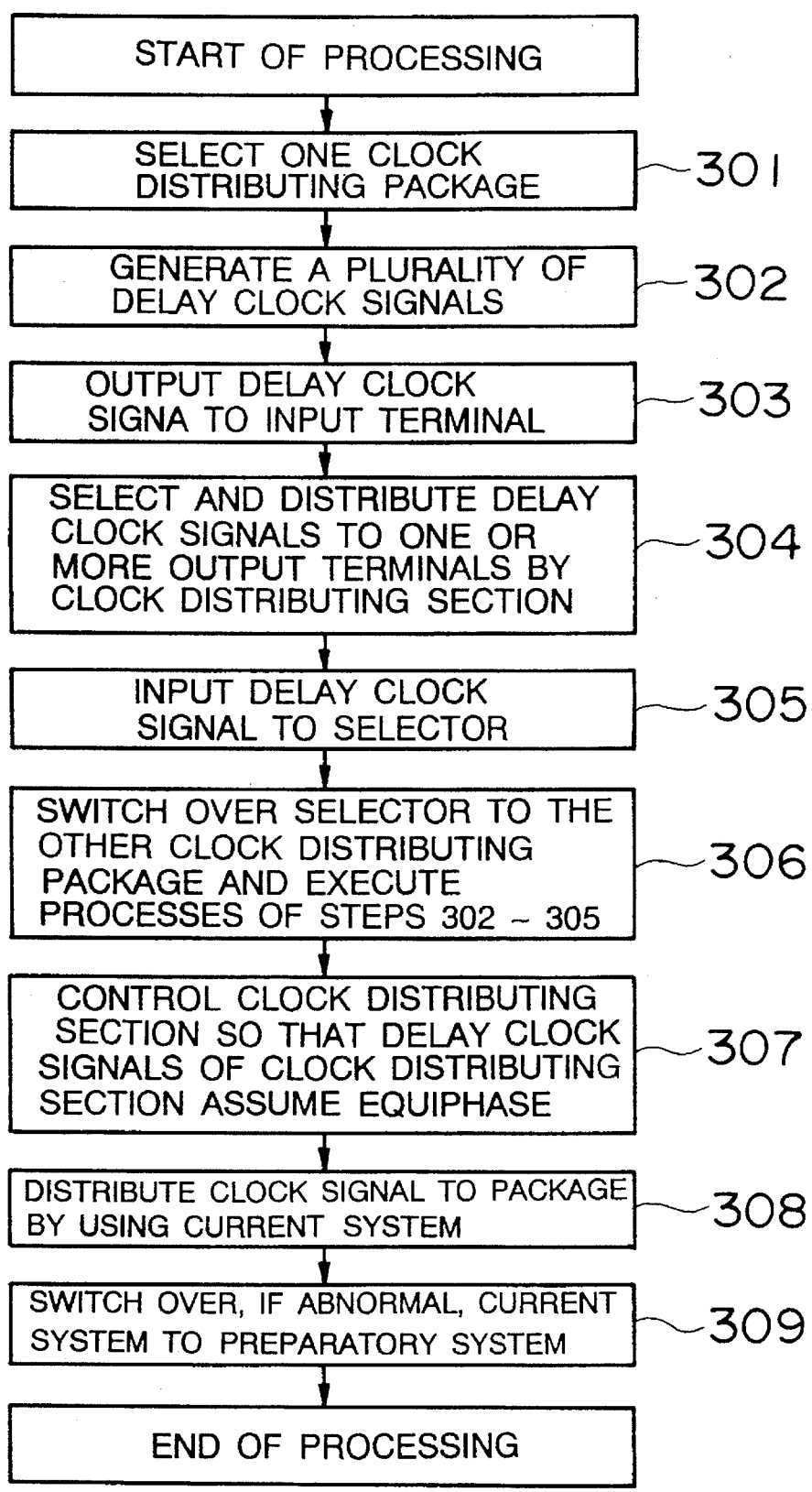
FIG. 6 is a flowchart showing the clock distributing method in accordance with the embodiment 3 of this invention.

FIG. 6 is a flowchart showing the clock distributing method in accordance with the embodiment 3 of this invention.

At the first onset, for example, the selector 33 selects any one of the clock distributing packages 18a (step 301).

The delay generating section 21a imparts the plurality of delay quantities $(0, τ, 2τ, 3τ, \ldots (N-1)τ)$ set with the integral multiple of the delay width τ to the clock signals on the basis of the delay width τ. A plurality of delay clock signals S00, S01, … S0(N−2), S0(N−1) are thereby generated (step 302).

The delay generating section 21a outputs the plurality of delay clock signals generated based on the plurality of delay quantities to the corresponding input terminals IT0~IT(N−1) of the clock distributing section 22a (step 303).

The clock distributing section 22a selects the input terminals corresponding to the desired delay clock signals under control of the distribution control section 24a, thereby distributing the desired delay clock signals to one or more output terminals (step 304).

Then, the desired delay clock signals are distributed to the selectors 33 of one or more packages 30 (step 305).

Next, the selector 33 is switched over to the other clock distributing package 18b. The clock distributing package 18b performs the processes in steps 302~303, thereby generating a plurality of delay clock signals S10, S11, ... S1(N−2), S1(N−1). Further, the processes in steps 303–305 are executed (step 306).

The distribution control section 24a controls connections between the input and output terminals of the clock distributing section 22a so that the delay clock signal inputted from the clock distributing section 22a assumes an equiphase with respect to the delay clock signal inputted from the clock distributing section 22b at input terminals a of the selector 33 (step 307).

The distribution control section 24b controls connections between the input and output terminals of the clock distributing section 22b so that the delay clock signal inputted from the clock distributing section 22a assumes an equiphase with respect to the delay clock signal inputted from the clock distributing section 22b at the input terminals a of the selector 33.

After finishing this equiphase processing, the clock distributing package 18a of a current system distributes the delay clock signals to the packages 30-0–30-(M−1) (step 308). Then, if an abnormality happens in the clock distributing package 18a of the current system, a clock distributing package 18b of a preparatory system is employed by switching over the selector 33 (step 309).

In this instance, the delay clock signals in the current and preparatory systems are adjusted beforehand to the equiphase, and therefore a phase difference is not caused at all.

<Embodiment 4>

Figure 7:
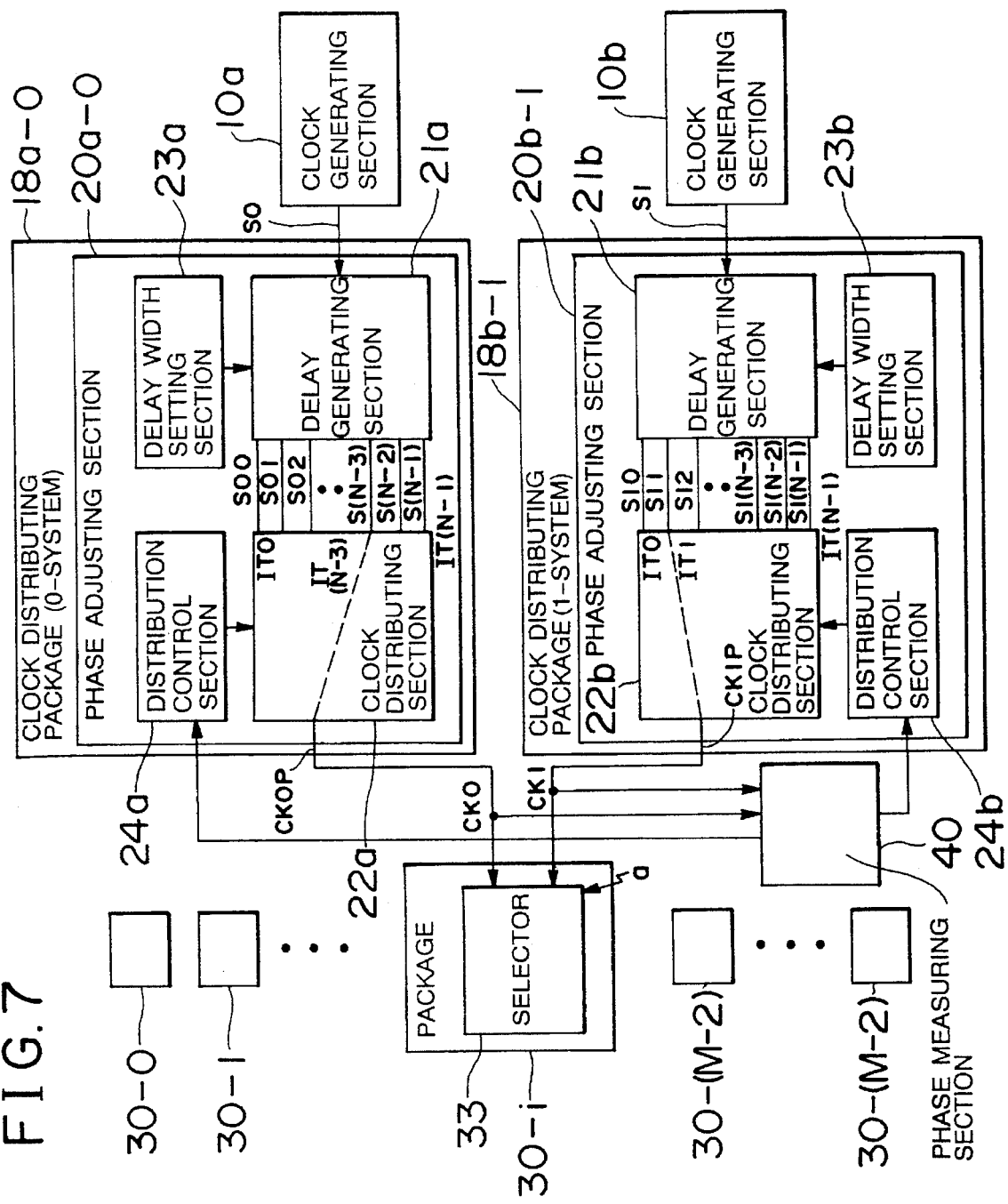
FIG. 7 is a block diagram illustrating a configuration of the clock distributing apparatus in accordance with an embodiment 4 of this invention.

Next, the clock distributing apparatus in a embodiment 4 of the present invention will be described. FIG. 7 is a block diagram showing a configuration of the clock distributing apparatus in accordance with the embodiment 4 of this invention. The clock distributing apparatus in the embodiment 4 comprises a clock distributing package 18a-0 of the current system (0 system) and a clock distributing package 18b-1 of the preparatory system (1 system).

The clock distributing package 18b-1 of the preparatory system is employed if some abnormality is seen in the clock distributing package 18a-0 of the current system. The clock distributing apparatus distributes the clock signals with a desired phase to the packages 30-0–30-(M−1).

The clock distributing package 18a-0 is provided with a phase adjusting section 20a-0. The clock distributing package 18b-1 is provided with a phase adjusting section 20b-1. The clock generating section 10a is connected to the phase adjusting section 20a-0. The clock generating section 10b is connected to the phase adjusting section 20b-1.

Each of the packages 30-0–30-(M−1) is provided with the selector 33 for selecting either the clock distributing package 18a-0 of the current system or the clock distributing package 18b-1 of the preparatory system.

The clock distributing package 18a-0 of the current system includes the delay generating section 21a, the clock distributing section 22a, the distribution control section 24a and the delay width setting section 23a. The configurations of the delay generating section 21a, the clock distributing section 22a and the delay width setting section 23a have already been explained in the embodiment 3, and hence the details thereof will be omitted.

The clock distributing package 18b-1 of the preparatory system includes the delay generating section 21b, the clock distributing section 22b, the distribution control section 24b and the delay width setting section 23b. The configurations of the delay generating section 21b, the clock distributing section 22b and the delay width setting section 23b have already been explained in the embodiment 3, and hence the details thereof will be omitted.

A phase measuring section 40 measures a phase difference between the phase of the delay clock signal inputted from the clock distributing section 22a to the input terminal of the selector 33 and the phase of the delay clock signal inputted from the clock distributing section 22b to the input terminal thereof.

Based on the phase difference given from the phase measuring section 40, the distribution control section 24a selects the input terminal of the clock distributing section 22a so that the delay clock signal inputted from the clock distributing section 22a to the input terminal of the selector 33 assumes the equiphase with respect to the delay clock signal inputted from the clock distributing section 22b.

Based on the phase difference given from the phase measuring section 40, the distribution control section 24b selects the input terminal of the clock distributing section 22b so that the delay clock signal inputted from the clock distributing section 22a to the input terminal of the selector 33 assumes the equiphase with respect to the delay clock signal inputted from the clock distributing section 22b.

Figure 9:
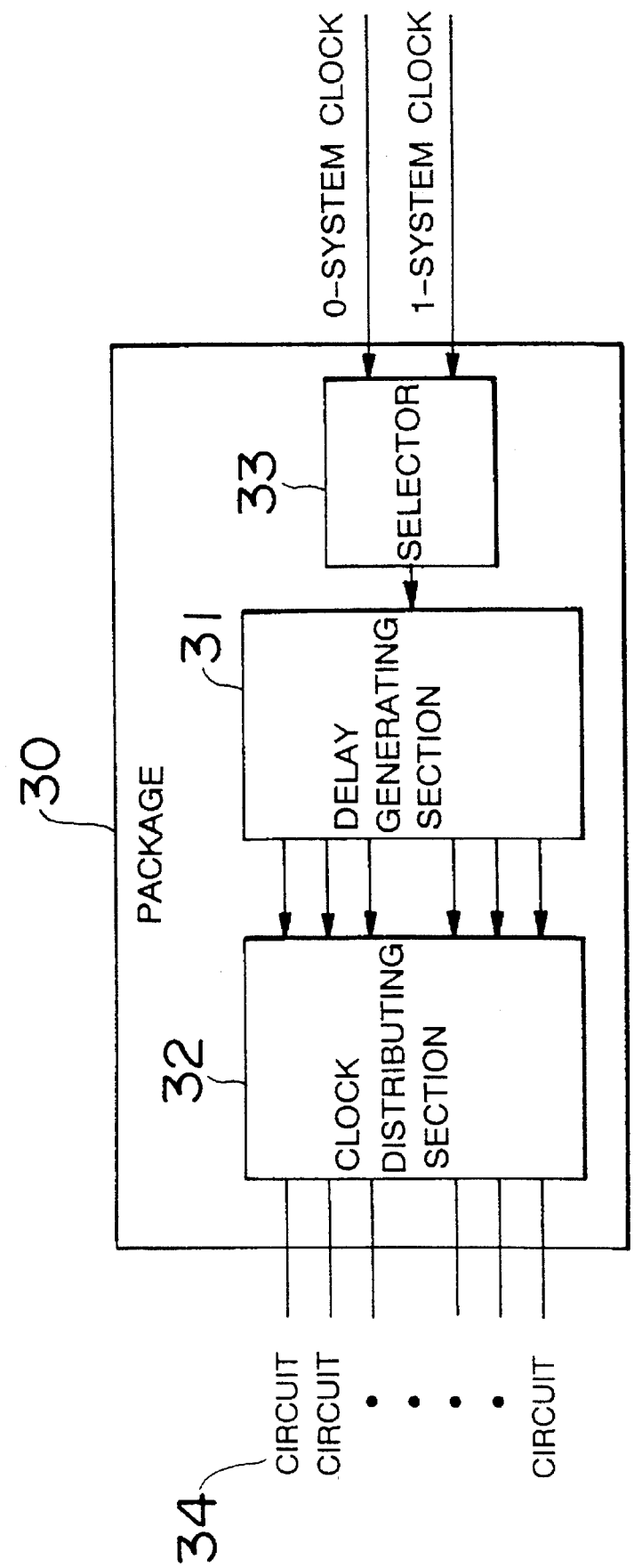
FIG. 9 is a diagram illustrating an in-package clock distribution in accordance with the embodiment 4 of this invention.

FIG. 9 is a block diagram showing an internal configuration of each package. Each of the packages 30-0–30-(M−1) has the selector 33, a delay generating section 31, a clock distributing section 32 and a plurality of circuits 34 connected to the output terminals of the clock distributing section 32. The configurations of the delay generating section 31 and the clock distributing section 32 have already been explained in the embodiment 1, and hence the details thereof will be omitted.

<Operations of Embodiment 4>

Figure 8:
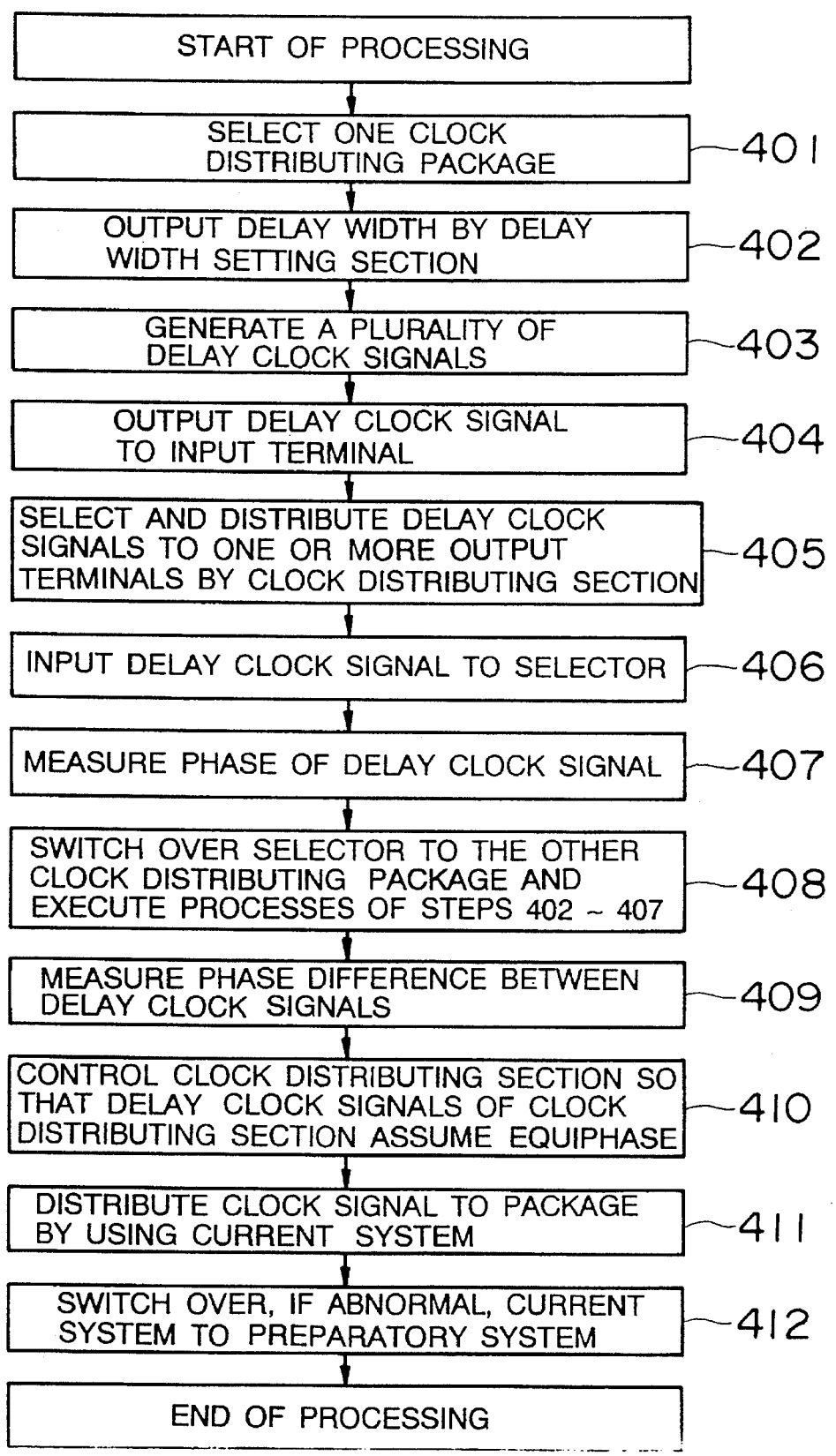
FIG. 8 is a flowchart showing the clock distributing method in accordance with the embodiment 4 of this invention.
Figure 10:
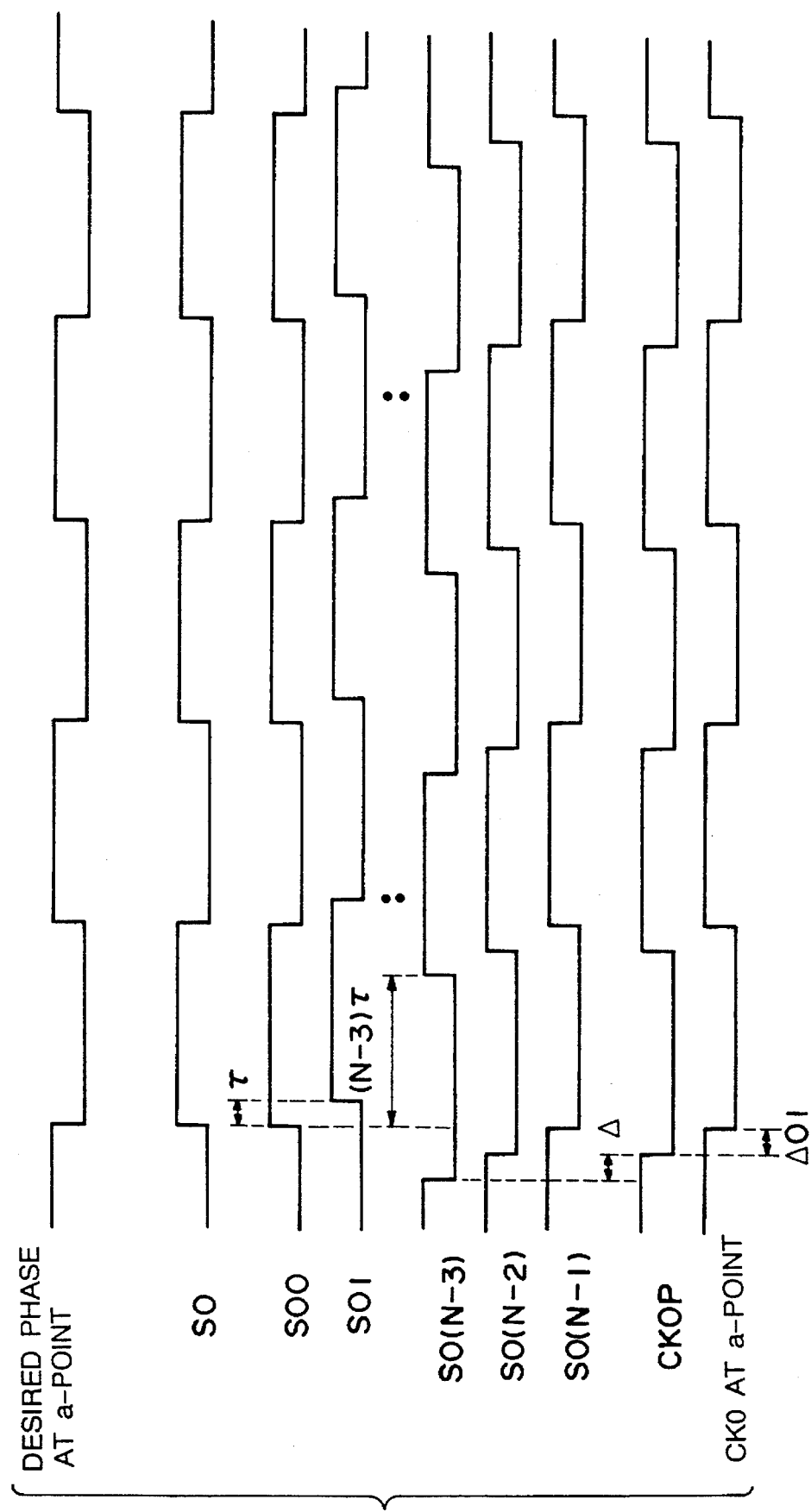
FIG. 10 is a timing chart showing actions of a 0-system clock distributing package in the embodiment 4.
Figure 11:
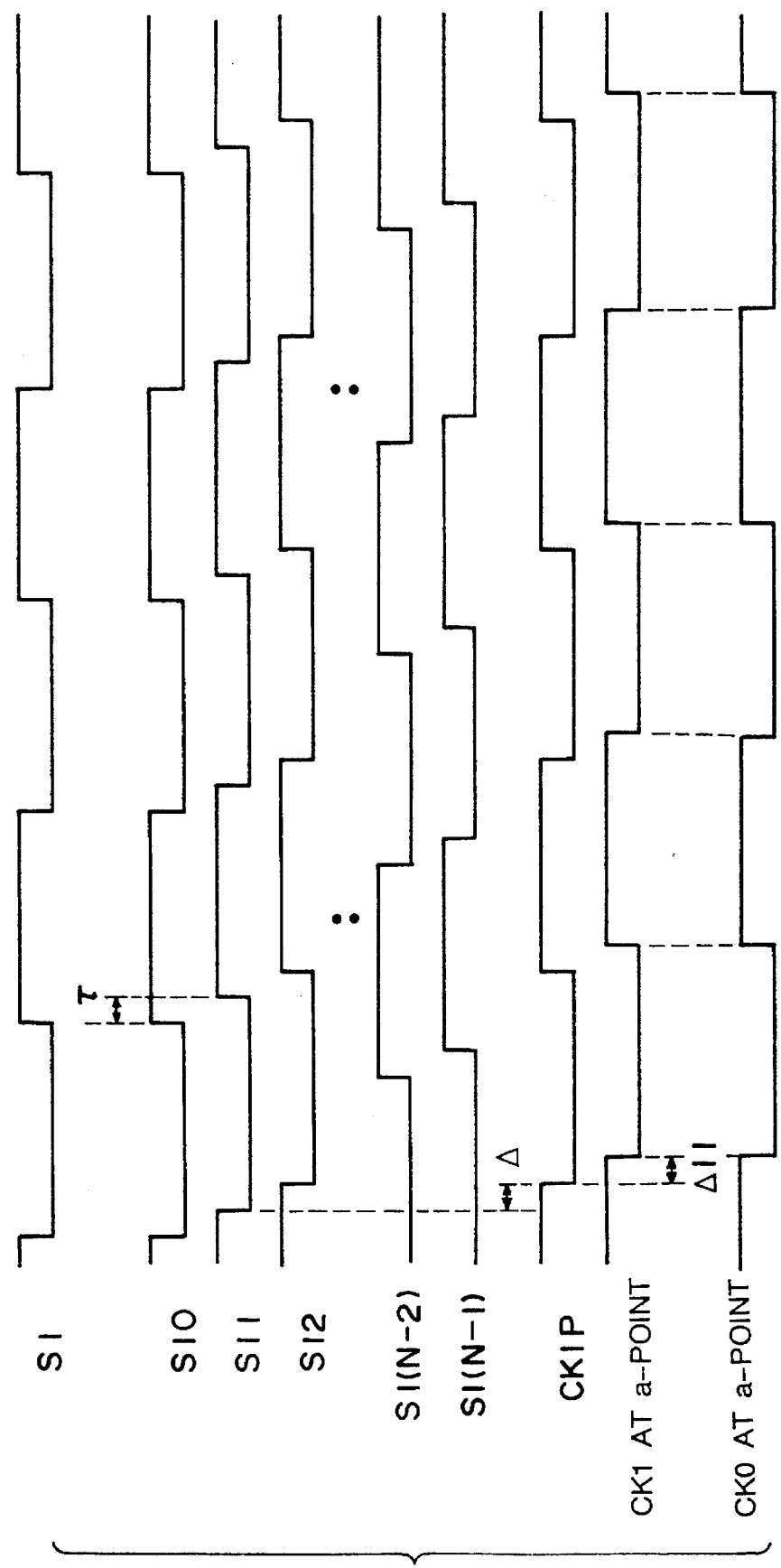
FIG. 11 is a timing chart showing actions of a 1-system clock distributing package in the embodiment 4.

Next, operations of the thus constructed embodiment 4 will be explained. FIG. 8 is a flowchart showing the clock distributing method in accordance with the embodiment 4 of this invention. FIG. 10 is a timing chart showing actions of the 0-system clock distributing package. FIG. 11 is a timing chart showing actions of 1-system clock distributing package.

To begin with, for instance, the selector 33 selects one clock distributing package (step 401). For example, the current-system clock distributing package 18a-0 is selected. The clock signals S0 is inputted from the clock generating section 10a to the delay generating section 21a.

Next, the delay width setting section 23a gives the delay width τ to the delay generating section 21a (step 402). The delay generating section 21a imparts the plurality of delay quantities (0, τ, 2τ, 3τ, ... (N−1)τ) set with the integral multiple of the delay width τ to the clock signals S0 on the basis of the delay width τ. A plurality of delay clock signals S00, S01, ... S0(N−2), S0(N−1) are thereby generated (step 403).

Then, the delay generating section 21a outputs the plurality of delay clock signals generated based on the plurality of delay quantities to the corresponding input terminals IT0–IT(N−1) of the clock distributing section 22a (step 404).

The clock distributing section 22a selects the input terminals corresponding to the desired delay clock signals under control of the distribution control section 24a, thereby distributing the desired delay clock signals to one or more output terminals (step 405).

Subsequently, the desired delay clock signals are distributed to the selectors 33 of one or more packages 30 (step 406).

Further, the phase measuring section 40 measures the phases of the desired delay clock signals from the clock distributing section 22a at the input terminals a of the selectors 33 (step 407). Next, the selector 33 is switched over to the other clock distributing package 18b-1 (step 408). The clock distributing package 18b-1 performs the processes in steps 401–403. The plurality of delay clock signals S10, S11, . . . S1(N–2), S1(N–1) are thereby generated. Further, the processes in steps 404–407 are executed.

Then, the phase measuring section 40 measures a phase difference between the phase of the delay clock signal inputted from the clock distributing section 22a and the phase of the delay clock signal inputted from the clock distributing section 22b (step 409).

Based on the phase difference given from the phase measuring section 40, the distribution control section 24a selects the input terminal of the clock distributing section 22a so that the delay clock signal inputted from the clock distributing section 22a to the input terminal a of the selector 33 assumes the equiphase with respect to the delay clock signal inputted from the clock distributing section 22b (step 410).

Based on the phase difference given from the phase measuring section 40, the distribution control section 24b selects the input terminal of the clock distributing section 22b so that the delay clock signal inputted from the clock distributing section 22a to the input terminal a of the selector 33 assumes the equiphase with respect to the delay clock signal inputted from the clock distributing section 22b.

In the example shown in FIG. 7, the clock distributing section 22a inputs the delay clock signal S0(N–3) shown in FIG. 10 from the input terminal IT(N–3) corresponding to the delay quantity $\tau$(N–3). A delay quantity $\Delta$ relative to in-package wiring is added to the delay clock signal S0(N–3) of the clock distributing section 22a, thereby obtaining a delay clock signal CK0P. Further, a transmission delay quantity $\Delta$01 between the package 33 and a package 22a is added to the delay clock signal CK0P, thereby obtaining a delay clock signal CK0. This delay clock signal CK0 is inputted to the input terminal a with a desired phase.

On the other hand, as illustrated in FIG. 11, the clock distributing section 22b inputs the delay clock signal S11 from the input terminal IT1 corresponding to the delay quantity $\tau$. The delay quantity $\Delta$ relative to the in-package wiring is added to the delay clock signal S11 of the clock distributing section 22b, thereby obtaining a delay clock signal CK1P. Besides, a transmission delay quantity $\Delta$11 between the package 33 and a package 22b is added to the delay clock signal CK1P, thereby obtaining a delay clock signal CK1. This delay clock signal CK1 is inputted to the input terminal a with a desired phase.

Namely, the delay clock signal CK0 assumes the equiphase with respect to the delay clock signal CK1 at the input terminal a.

After finishing the equiphase processing described above, the current-system clock distributing package 18a-0 distributes the delay clock signal to each of the packages 30 (step 411). Then, if the abnormality happens in -the current-system clock distributing packages 18a-0, the selector 33 is switched over, and consequently the preparatory-system clock distributing package 18b-1 is employed (step 412).

In this case, the delay clock signals in the current and preparatory systems are adjusted beforehand to the equiphase, and, therefore, a phase difference is not caused at all.

Further, the desired delay clock signals among the clock signals supplied to within the package 30 are distributed to the respective circuits 34 through the delay generating section 31 and the clock distributing section 32.

Note that the delay clock signals relative to the current-system package 18a-0 and the preparatory-system package 18b-1 are automatically adjusted to assume the equiphase by use of the phase measuring section 40 and the distribution control sections 24a, 24b. For instance, this phase adjustment may be manually conducted.

<Embodiment 5>

Figure 12:
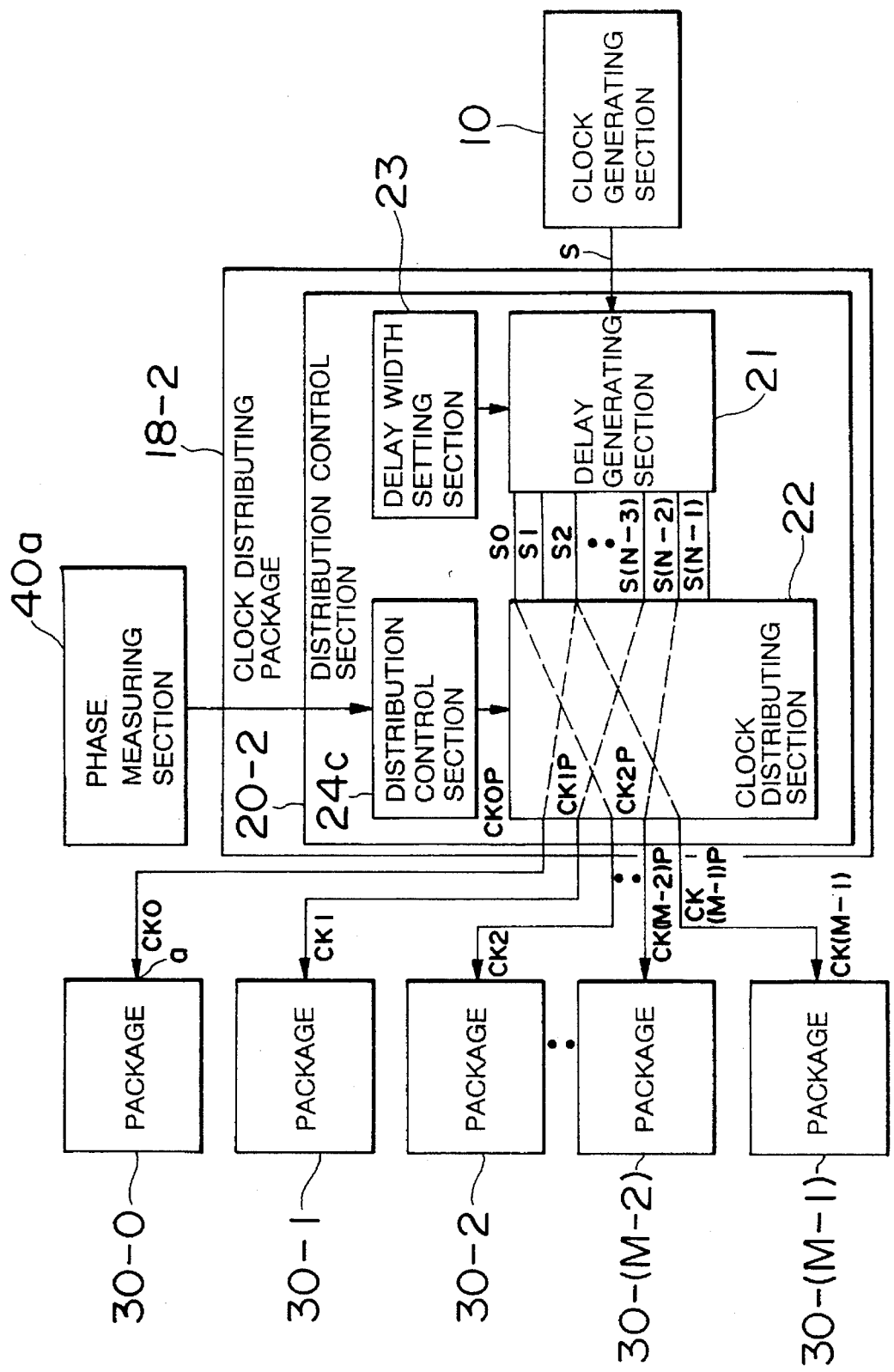
FIG. 12 is a block diagram showing a configuration of the clock distributing apparatus in accordance with an embodiment 5 of this invention.

Next, the clock distributing apparatus in a embodiment 5 of the present invention will be described. FIG. 12 is a block diagram showing a configuration of the clock distributing apparatus in accordance with the embodiment 5 of this invention.

The clock distributing package 18-2 is provided between the clock generating section 10 for generating the clock signals and the plurality of packages 30-0~30-(M–1) which receive the clock signals. The clock distributing package 18-2 distributes the clock signals to the packages 30-0~30-(M–1) with a desired phase.

The clock distributing package 18-2 includes the delay generating section 21, the clock distributing section 22, the delay width setting section 23 and the distribution control section 24c. The configurations of the delay generating section 21, the clock distributing section 22 and the delay width setting section 23 are the same as those of the corresponding sections in the embodiment 1.

A phase measuring section 40a measures a phase of each delay clock signal in the packages 30-0~30-(M–1).

The distribution control section 24c performs the control to mutually connect the input terminals and the output terminals of the clock distributing section 22. Based on each phase difference given from the phase measuring section 40a, the distribution control section 24c controls the connections between the input terminals and the output terminals of the clock distributing section 22 so that all of the delay clock signals, when distributed to the packages to take synchronism with each other among the plurality of packages 30 receiving the delayed clock signals, assume the equiphase.

Note that the respective delay clock signals are adjusted to the equiphase by use of the phase measuring section 40a and the distribution control section 24c. For example, this phase adjustment may be manually effected.

<Operations of Embodiment 5>

Figure 13:
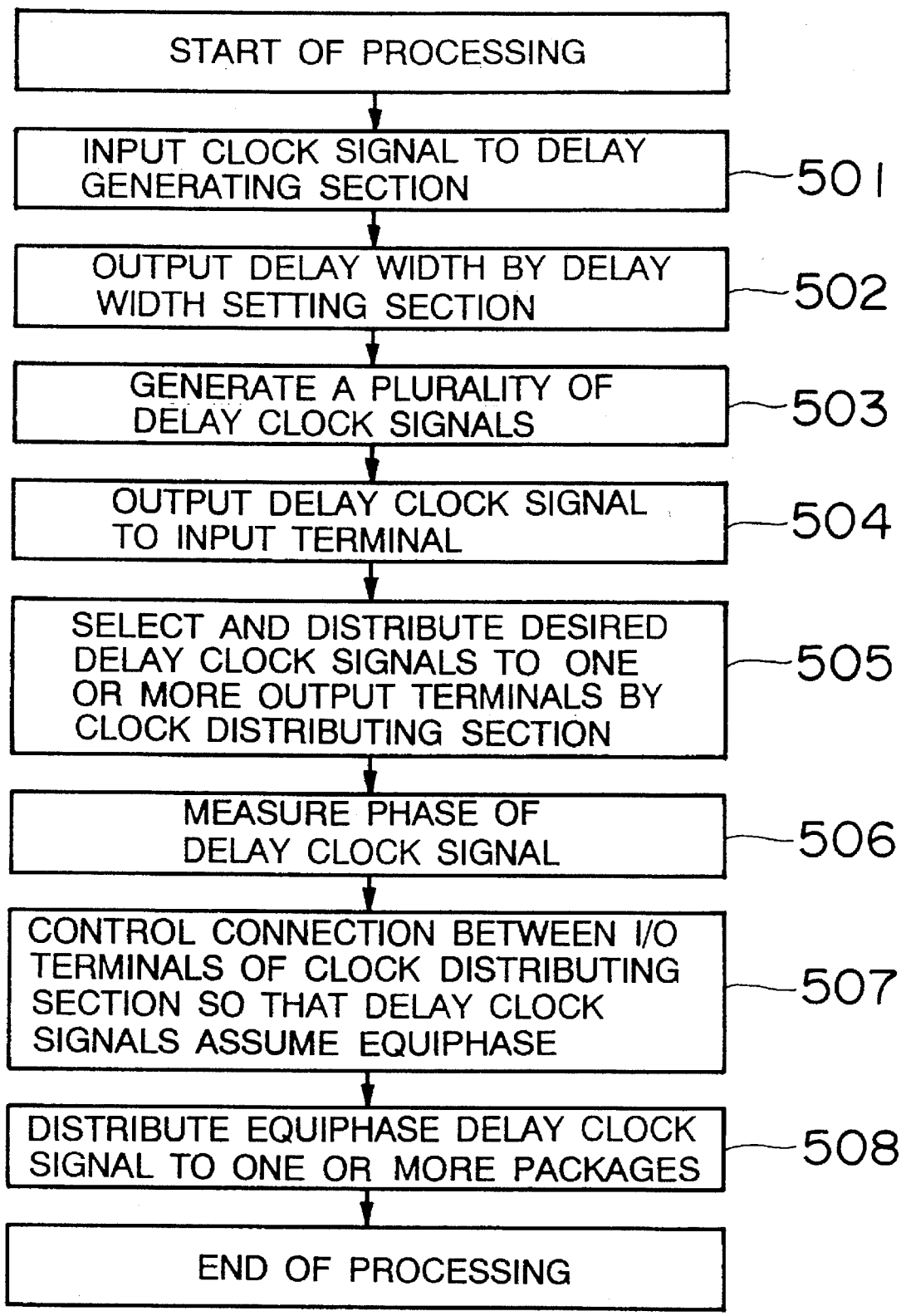
FIG. 13 is a flowchart showing the clock distributing method in accordance with the embodiment 5 of this invention.
Figure 14:
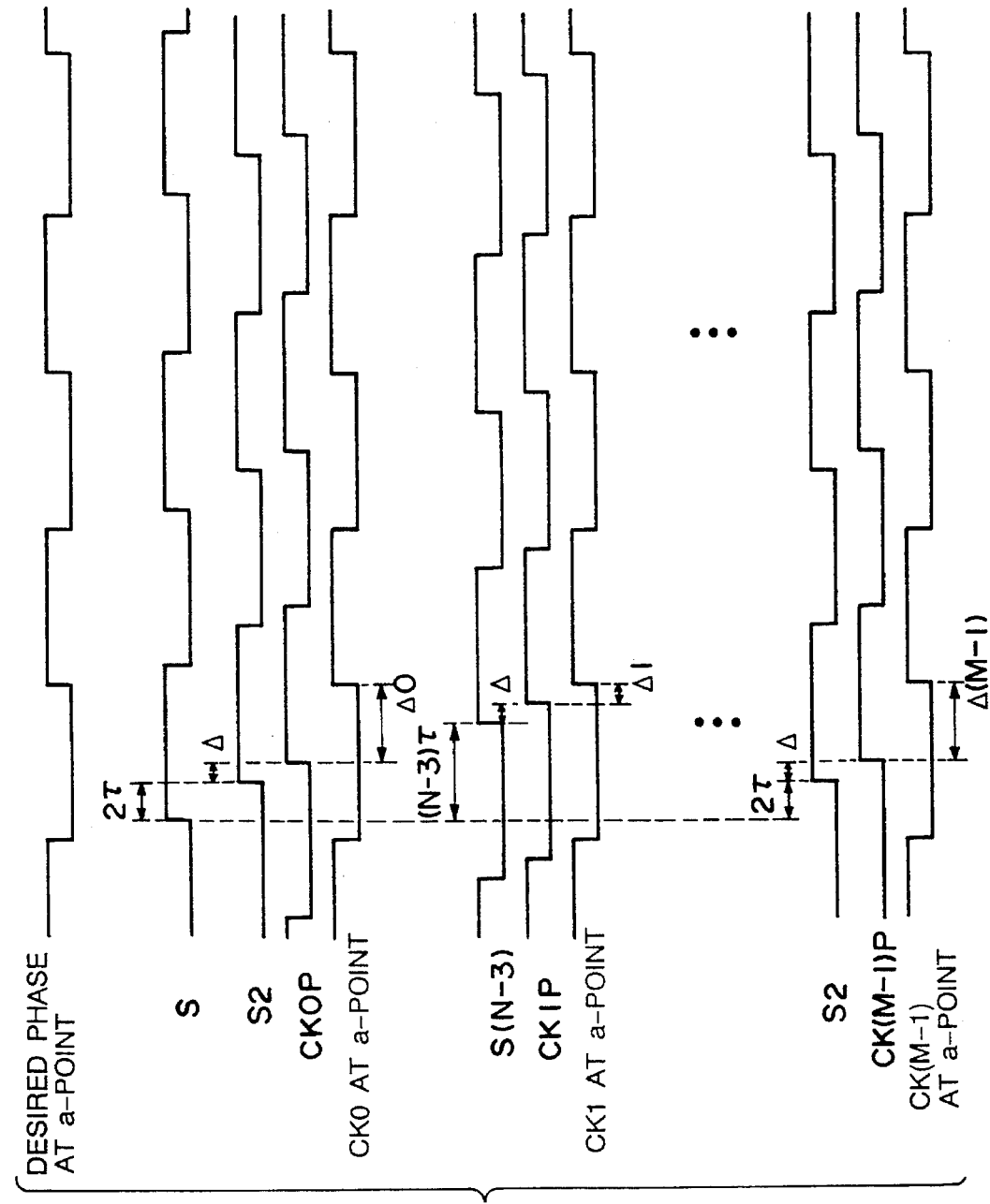
FIG. 14 is a timing chart showing actions of the clock distributing package in accordance with the embodiment 5 of this invention.

Next, operations of the embodiment 5 will be explained. FIG. 13 is a flowchart showing the clock distributing method in accordance with the embodiment 5 of this invention. FIG. 14 is a timing chart showing actions of the clock distributing package.

At first, the clock signals s generated by the clock generating section 10 are inputted to the delay generating section 21 (step 501). Next, the delay width setting section 23 gives the delay width $\tau$ to the delay generating section 21 (step 502). The delay generating section 21 imparts the plurality of delay quantities $(0, \tau, 2\tau, 3\tau, \ldots (N-1)\tau)$ set with the integral multiple of the delay width $\tau$ to the clock signals s on the basis of the delay width $\tau$. The plurality of delay clock signals S0, S1, . . . S(N–2), S(N–1) are thereby generated (step 503).

Then, the delay generating section 21 outputs the plurality of delay clock signals generated based on the plurality of delay quantities to the corresponding input terminals IT0~IT(N–1) of the clock distributing section 22 (step 504).

The clock distributing section 22 selects any of the input terminals under control of the distribution control section 24c, thereby distributing the delay clock signals to one or more output terminals (step 505).

Then, the phase measuring section 40a measures the phase of each delay clock signal in each package 30 (step 506).

Based on each phase difference given from the phase measuring section 40a, the distribution control section 24c next controls the connections between the input terminals and the output terminals of the clock distributing section 22 so that all of the delay clock signals distributed to the packages to take synchronism with each other among the plurality of packages receiving the delayed clock signals assume the equiphase (step 507). For instance, in an example shown in FIG. 12, the clock distributing section 22 inputs the delay clock signal S2 shown in FIG. 14 from the input terminal IT2 corresponding to the delay quantity $2\tau$. A delay quantity $\Delta$ relative to the in-package wiring is added to the delay clock signal S2 of the clock distributing section 22, thereby obtaining the delay clock signal CK0P. Further, a transmission delay quantity A0 between the package 33 and the package 22 is added to the delay clock signal CK0P, thereby obtaining the delay clock signal CK0. This delay clock signal CK0 is inputted to the input terminal a with a desired phase.

At this time, the delay quantity A relative to the in-package wiring is added to the delay clock signal S2 of the clock distributing section 22, thereby obtaining a delay clock signal CK(M−1)P. Besides, a transmission delay quantity $\Delta$(M−1) between the package 33 and the package 22 is added to a delay clock signal CK(M−1)P, thereby obtaining a delay clock signal CK(M−1). This delay clock signal CK(M−1) is inputted to the input terminal a with a desired phase.

Further, the clock distributing section 22 inputs a delay clock signal S(N−3) shown in FIG. 14 from the input terminal IT(N−3) corresponding to a delay quantity $\tau$(N−3). The delay quantity $\Delta$ relative to the in-package wiring is added to the delay clock signal S(N−3), thereby obtaining a delay clock signal CK1P. Further, the transmission delay quantity $\Delta$1 between the package 33 and the package 22 is added to the delay clock signal CK1P, thereby obtaining a delay clock signal CK1. The delay clock signal CK1 is inputted to the input terminal a with a desired phase.

In this manner, the delay clock signals exhibiting the equiphase are distributed to the packages 30-0~30-(M−1) to take the synchronism (step 508).

Thus, the single delay generating section 21 and the clock distributing section 22 are merely employed, and accordingly a configuration of the clock distributing package 18-2 can be simplified. At the same time, the delay clock signals exhibiting the equiphase can be distributed to one or more packages 30.

Moreover, the delay width setting section 23 stepwise sets the plurality of delay quantities by use of the delay width. The clock distributing section 22 selects the desired delay clock signals among the plurality of delay clock signals generated based on the plurality of stepwise delay quantities. It is therefore possible to reduce the number of steps of adjusting the phase of the delay clock signal for every package.

Note that the delay clock signals with respect to the respective packages to take synchronism are automatically adjusted to assume the equiphase by employing the phase measuring section 40 and the distribution control section 24c. For instance, this phase adjustment may be manually performed.

It is apparent that, in this invention, a wide range of different working modes can be formed based on the invention without deviating from the spirit and scope of the invention. This invention is not restricted by its specific working modes except being limited by the appended claims.

What is claimed is:

1. A clock distributing apparatus provided between a clock generating means for generating clock signals and a plurality of devices for receiving the clock signals, said apparatus comprising:

a phase adjusting means for adjusting a phase of the clock signal to distribute the clock signals from said clock generating means to each of said plurality of devices, said phase adjusting means including:

a delay generating means for generating a plurality of clock signals by imparting plural kinds of delay quantities to the clock signals from said clock generating means; and a clock distributing means, having input terminals corresponding to the respective delay clock signals and output terminals corresponding to said respective devices, for distributing desired delay clock signals among the plurality of delay clock signals to one or more output terminals via the input terminals corresponding to the desired delay clock signals, wherein said clock generating means includes a first clock generating means for generating a first clock signal and a second clock generating means for generating a second clock signal assuming a phase different from that of the first clock signal, wherein said phase adjusting means includes a first phase adjusting means for inputting the first clock signal from said first clock generating means and a second phase adjusting means for inputting the second clock signal from said second clock generating means, wherein each of said devices includes a selecting means for selecting any one of said first and second phase adjusting means, and wherein said first and second phase adjusting means include a delay generating means for generating a plurality of delay clock signals by giving plural kinds of delay quantities to the clock signals inputted, a clock distributing means having input terminals corresponding to the delay clock signals and output terminals corresponding to said devices, for distributing a desired delay clock signal among said plurality of delay clock signals to one or more output terminals via the input terminal corresponding to the desired delay clock signal, and a distribution control means for controlling the input terminals of said clock distributing means so that a phase of the delay clock signal from one of said clock distributing means and a phase of the delay clock signal from another of said clock distributing means becomes equiphases at the input of said selecting means.

2. The clock distributing apparatus according to claim 1, further comprising a phase measuring means for measuring a phase of the delay clock signal from said one clock distributing means and a phase of the delay clock signal from said other clock distributing means at the input of said selecting means, wherein said distribution control means selects the input terminal of said clock distributing means so that two phases measured by said phase measuring means become equiphases.

3. The clock distributing apparatus according to claim 1, wherein said first and second phase adjusting means include a delay width setting means for setting a delay width defined as a basis of each delay quantity to stepwise change each of said plurality of delay quantities.

4. The clock distributing apparatus according to claim 3, wherein said delay width setting means provided in said first and second phase adjusting means changes the delay width to a different delay width to obtain a desired delay clock signal if no desired delay clock signal exists in the delay clock signals generated based on the stepwise delay quantities.

5. The clock distributing apparatus according to claim 1, wherein said selecting means switches over, if a trouble happens in one of said first and second phase adjusting means, said one phase adjusting means to said other phase adjusting means.

6. The clock distributing apparatus according to claim 1, wherein each of said devices includes a plurality of circuits for executing processes, a delay generating means for generating the plurality of delay clock signals by imparting plural kinds of delay quantities to the clock signals from said selecting means and a clock distributing means, having input terminals corresponding to the respective delay clock signals and output terminals corresponding to said respective circuits, for distributing desired delay clock signals among the plurality of delay clock signals to one or more output terminals via the input terminals corresponding to the desired delay clock signals.

7. A clock distributing method of distributing clock signals obtained by a clock generating step of generating the clock signals to each of a plurality of devices, said method comprising:

a phase adjusting step for adjusting a phase of the clock signal to distribute the clock signals obtained in said clock generating step to each of said plurality of devices, said phase adjusting step including:

a delay generating step for generating a plurality of clock signals by imparting plural kinds of delay quantities to the clock signals obtained in said clock generating step; and a clock distributing step of distributing desired delay clock signals among a plurality of delay clock signals to one or more output terminals via the input terminals corresponding to the desired delay clock signals by use of input terminals corresponding to the respective delay clock signals and output terminals corresponding to said respective devices, wherein said clock generating step includes a first clock generating step of generating a first clock signal and a second clock generating step of generating a second clock signal assuming a phase different from that of the first clock signal, wherein said phase adjusting step includes a first phase adjusting step of inputting the first clock signal obtained by said first clock generating step and a second phase adjusting step of inputting the second clock signal obtained by said second clock generating step, wherein there is included a selecting step of selecting any one of said first and second phase adjusting steps, and wherein said first and second phase adjusting steps include a delay generating step of generating a plurality of delay clock signals by giving plural kings of delay quantities to the clock signals inputted, a clock distributing step of distributing a desired clock signal among said plurality of delay clock signals to one or more output terminals via the input terminal corresponding to the desired delay clock signal by use of an input terminal corresponding to the delay clock signal and an output terminal corresponding to said device, and a distribution control step of controlling the input terminal employed in said clock distributing step so that a phase of the delay clock signal obtained by said one clock distributing step and a phase of the delay clock signal obtained by another clock distributing step become equiphases at the input in said selecting step.

8. The clock distributing method according to claim 7, further comprising a phase measuring step of measuring a phase of the delay clock signal obtained in said one clock distributing step and a phase of the delay clock signal obtained in said other clock distributing step at the input in said selecting step, wherein said distribution control step is to select the input terminal used in said clock distributing step so that two phases obtained by said phase measuring step become equiphases.

9. The clock distributing method according to claim 7, wherein said first and second phase adjusting steps include a delay width setting step of setting a delay width defined as a basis of each delay quantity to stepwise change each of said plurality of delay quantities.

10. The clock distributing method according to claim 9, wherein said delay width setting step included in said first and second phase adjusting steps is to change the delay width to a different delay width to obtain a desired delay clock signal if no desired delay clock signal exists in the delay clock signals generated based on the stepwise delay quantities.

11. The clock distributing method according to claim 7, wherein said selecting step is to switch over, if an abnormality happens in one of said first and second phase adjusting steps, said one phase adjusting step to said other phase adjusting step.

12. The clock distributing method according to claim 7, further comprising a processing step of executing a process in each of a plurality of circuits provided in said respective devices, a delay generating step of generating the plurality of delay clock signals by imparting plural kinds of delay quantities to the clock signals selected by said selecting step and a clock distributing step of distributing a desired delay clock signal among the plurality of delay clock signals to one or more output terminals via the input terminal corresponding to the desired delay clock signal by use of an input terminal corresponding to the delay clock signal and an output terminal corresponding to said circuit.

* * * * *